July 8, 1941.   A. C. VAN HOOYDONK   2,248,835
STUFFING APPARATUS
Filed March 11, 1939
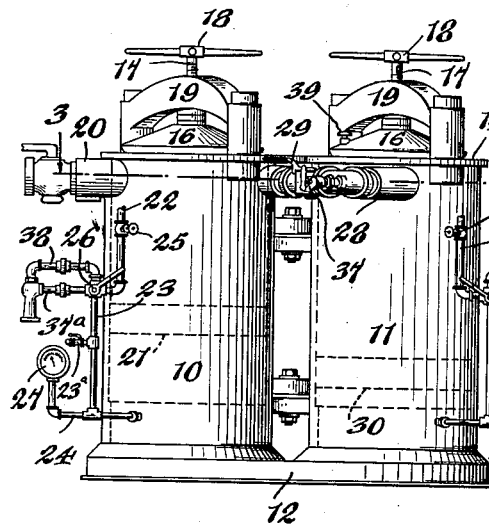
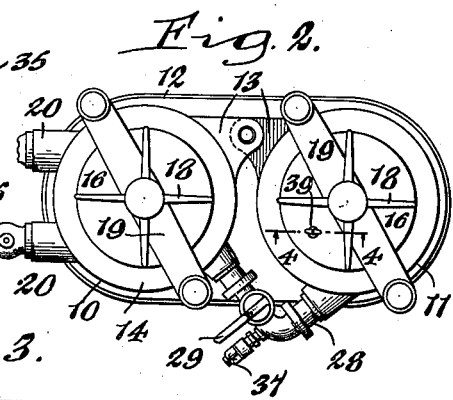
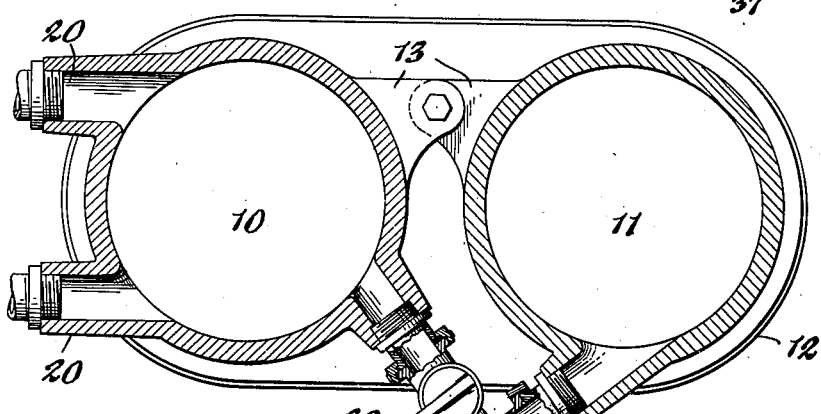
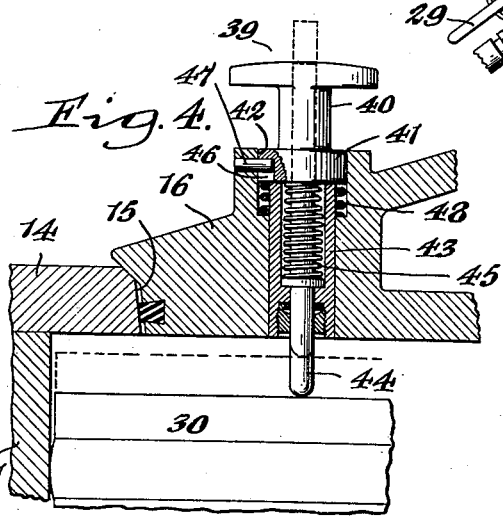
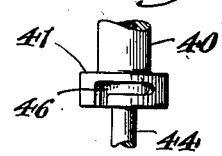
Inventor,
Adrian C. Van Hooydonk,
by Walter P. Geyer
Attorney.

Patented July 8, 1941

2,248,835

UNITED STATES PATENT OFFICE 2,248,835

STUFFING APPARATUS

Adrian C. Van Hooydonk, Buffalo, N. Y., assignor to John E. Smith's Sons Company, Buffalo, N. Y., a corporation of New York Application March 11, 1939, Serial No. 261,251

4 Claims. (Cl. 17—39)

This invention relates to improvements in extruding machines such as are employed, for example, in the stuffing of sausage casings and more particularly the invention is concerned with a machine of the type comprising a working cylinder which provides a container for a substantial amount of the material to be extruded and a piston which is movable in the cylinder to expel the said material.

The principal object of the invention is to produce a machine of this character wherein provision is made for reducing to a minimum the time required for refilling the working cylinder and thereby enable substantially continuous use of the machine, this object contemplating the association with the working cylinder of an auxiliary cylinder into which the material to be extruded is initially introduced and from which the said material is discharged into the working cylinder at the time the latter becomes empty or partially so.

A further object is to provide a machine which is so designed that the operator will be warned when the entire contents of the auxiliary cylinder have been transferred to the working cylinder.

A still further object is to provide a continuous stuffing machine in which provision is made for expelling any air present in the material to be extruded prior to its introduction into the working cylinder.

In the accompanying drawing—

Figure 1 is a side elevation of a machine embodying the features of the invention. Figure 2 is a top view thereof. Figure 3 is an enlarged horizontal section taken along line 3—3 of Figure 1. Figure 4 is an enlarged detail section through the device associated with the auxiliary cylinder for indicating when the piston of the latter is approaching the limit of its working stroke and is taken along lines 4—4 of Figure 2. Figure 5 is a fragmentary view of the said device, the parts being shown in elevation.

Similar characters of reference indicate corresponding parts throughout the several views.

The machine, as illustrated, includes a working cylinder 10 and an auxiliary cylinder 11. The said cylinders are generally similar in construction; they are mounted side by side upon a base 12; and they are formed with cooperating lugs 13 which are bolted together. Rings 14 which are secured to the upper ends of the two cylinders are formed to provide seats 15 (Figure 4) for closure members 16. The latter, as disclosed in my Patent No. 1,880,182, granted September 27, 1932, are removably secured upon the seats 15 by screws 17 which carry handwheels 18 and which are carried by yokes 19. The said yokes are designed to permit the closure members to be swung to one side to enable the meat-dough or other material to be introduced into the cylinders.

The working cylinder 10 is provided at its upper end with valved outlets 20 through which the meat-dough or other material is expelled for stuffing purposes by a floating piston 21. The latter is movable for this purpose in response to air or other fluid medium which is introduced into the cylinder under a suitable pressure through a supply pipe 22 and branch pipes 23 and 24, the supply of the fluid medium to the cylinder being controlled by a main valve 25 and an auxiliary valve 26 while the pressure acting against the piston is indicated upon a gauge 27.

When the cylinder 10 has been exhausted it is refilled from the auxiliary cylinder 11. To this end the two cylinders communicate through a feed pipe 28 which includes a control valve 29 and through which the contents of the auxiliary cylinder may be discharged into the working cylinder, a floating piston 30 being employed for this purpose. The latter is movable in response to air or other fluid medium which is introduced into the cylinder under a suitable pressure through a supply pipe 31 and branch pipes 32 and 33, the supply of the fluid medium to the cylinder being controlled by a main valve 34 and an auxiliary valve 35 while the pressure acting against the piston is indicated upon a gauge 36.

From the foregoing it will be apparent that during use of the machine the control valve 29 will be closed and that the auxiliary cylinder, therefore, may be filled with the material to be extruded, whereby it may be introduced into the working cylinder as soon as the contents of the latter are exhausted, or if desired, at a time prior to complete exhaustion. During the filling of the working cylinder some of the material may be discharged from it through its outlet. In order that any air in the material may be removed before the latter enters the working cylinder, an exhaust valve 37 is preferably included in the feed pipe 28 in advance of the control valve 29. After the auxiliary cylinder is filled and its closure secured in place, assuming the control valve to be closed, the piston 30 is actuated to place the material under pressure. The exhaust valve 37 is then opened to permit the air in the material to escape. The said valve is held open until the material itself starts to discharge, this being an indication that all of the air has been expelled. When it becomes necessary to refill the working cylinder, the valve 29 is opened and as the piston 30 is moved toward the upper limit of its working stroke it is operative to force the contents of the auxiliary cylinder through the feed pipe 28 into the working cylinder. During this operation the valve 26 in the air supply line 22 is closed while the valve 26 is moved to a position in which it connects the branch pipe 23 with an exhaust pipe 37a, whereby to permit the escape from the working cylinder of the fluid medium utilized in actuating the piston 21 as the latter is returned to its original position. If desired, a safety valve 23a may be interposed in the pipe 23 to automatically effect the exhaust of the pressure in the cylinder 10 below its piston 21, should the operator neglect to properly set the valve 26.

Preferably the valve 26 is so designed that when it is moved to connect the branch pipe 23 with the exhaust pipe 37a, it also connects the air supply line 22 with a pipe 38 which is connected with the outlet of the exhaust pipe. By opening the valve 25 slightly, therefore, the fluid medium which is discharged through the outlet of the exhaust pipe is operative to create a vacuum in the working cylinder behind the piston thereby insuring return of the latter to its initial position. In a like manner the piston 30 may be restored to its original position after it has completed its working stroke. It is understood, of course, that, if desired, the piston of the working cylinder may be restored to its starting position prior to the refilling of the latter in the manner described.

In order to warn the operator when the piston 30 is approaching the limit of its working stroke, and hence when the contents of the auxiliary cylinder have been discharged into the working cylinder, a telltale 39 is mounted upon the closure member of the auxiliary cylinder. This telltale includes a tubular-like head or handle 40 terminating at its lower end in a collar 41 fitted in a recess 42 formed in the closure member 16. Fitted in the latter axially of such recess is a sleeve 43 in the lower portion of which a pin or plunger 44 is guided, a spring 45 applied to this pin normally urging it to the lowered position shown by full lines in Figure 4, wherein it extends below the bottom face of the closure member in the path of the final operating stroke of the piston 30. In this position the upper end of the pin is concealed within the tubular head 40. As the piston approaches the upper limit of its operating stroke, it engages the pin and moves it upwardly through and above the top face of the head to the dotted line position shown in Figure 4, whereby to expose the upper end of the pin and warn the operator of the condition of the auxiliary cylinder.

The collar 41 of the head 40 has a bayonet slot 46 in its periphery with which a pin 47 cooperates. A spring 58 acting against the head normally retains it against accidental displacement, and the structure as a whole enables the telltale to be detached when desired.

While these improvements have been shown and described as particularly applicable to stuffing apparatus employed in the meat art, it is to be understood that they are equally applicable to like apparatus employed in other arts where a continuous stuffing or extruding operation is desirable.

I claim as my invention:

1. A machine of the character described, comprising a working cylinder constituting a container for material to be extruded and having an outlet, means for expelling the material through said outlet, an auxiliary cylinder disposed in cooperating relation with said working cylinder and constituting a container for the material, a passage connecting said cylinders, means for discharging the material introduced into said auxiliary cylinder through said passage into said working cylinder, and means for cutting off communication between said cylinders.

2. A machine of the character described, comprising a working cylinder constituting a container for material to be extruded and having an outlet, a floating piston for expelling the material through said outlet, an auxiliary cylinder disposed in cooperative relation with said working cylinder and constituting a container for the material, a conduit connecting said cylinders, a floating piston in said auxiliary cylinder for discharging the material introduced into it through said conduit into said working cylinder, a valve in said conduit for cutting off communication between said cylinders, and means for introducing a fluid medium under pressure into said cylinders to actuate said pistons.

3. A machine of the character described, comprising a working cylinder constituting a container for material to be extruded and having an outlet, means for expelling the material through said outlet, an auxiliary cylinder disposed in cooperative relation with said working cylinder and constituting a container for the material, a passage connecting said cylinders, means for discharging the material introduced into said auxiliary cylinder through said passage into said working cylinder, means for cutting off communication between said cylinders, and means in said connecting passage for exhausting from said auxiliary cylinder air present in said material prior to the introduction of the latter into said working cylinder.

4. A machine of the character described, comprising a working cylinder constituting a container for material to be extruded and having an outlet, a floating piston for expelling the material through said outlet, an auxiliary cylinder disposed in cooperative relation with said working cylinder and constituting a container for the material, a conduit connecting said cylinders, a floating piston in said auxiliary cylinder for discharging the material introduced into it through said conduit into said working cylinder, a valve in said conduit for cutting off communication between said cylinders, a second valve in said conduit for exhausting air from said auxiliary cylinder, and means for introducing a fluid medium under pressure into said cylinders to actuate said pistons.

ADRIAN C. VAN HOOYDONK.